(No Model.)
J. F. OTT.
REGULATOR FOR DYNAMO ELECTRIC MACHINES.
No. 265,858. Patented Oct. 10, 1882.
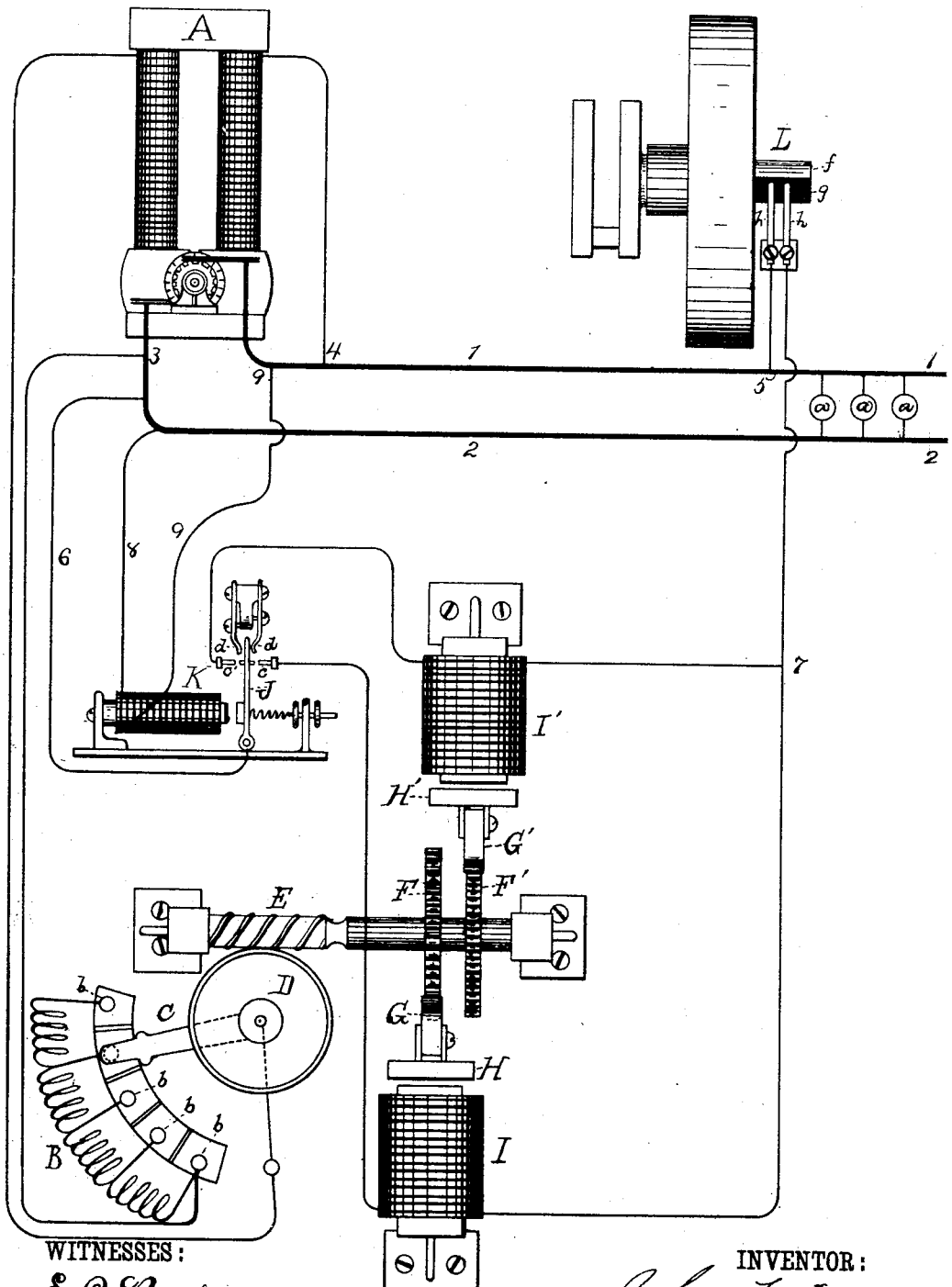
WITNESSES:
E. C. Rowland
INVENTOR:
John F. Ott
BY Rich. N. Dyer,
ATTORNEY.

UNITED STATES PATENT OFFICE.

JOHN F. OTT, OF NEWARK, NEW JERSEY, ASSIGNOR TO THE EDISON ELECTRIC LIGHT COMPANY, OF NEW YORK, N. Y.

REGULATOR FOR DYNAMO-ELECTRIC MACHINES.

SPECIFICATION forming part of Letters Patent No. 265,858, dated October 10, 1882.

Application filed August 14, 1882. (No model.)

*To all whom it may concern:*

Be it known that I, JOHN F. OTT, of Newark, in the county of Essex and State of New Jersey, have invented a new and useful Improvement in the Regulation of Dynamo and Magneto Electric Machines; and I do hereby declare that the following is a full and exact description of the same, reference being had to the accompanying drawing, and to the letters of reference marked thereon.

My invention relates to means for automatically varying the resistance of the field-circuit of a dynamo or magneto electric machine for the purpose of regulating the generation of current by the machine, my object being to produce a mechanism for this purpose which shall act gradually and continuously, and not by sudden and limited impulses, such as are produced by the movement of an armature of an electro-magnet; and my invention consists in novel and peculiar devices for accomplishing this object, as hereinafter described, and specified in the claims.

The accompanying drawing is a view, partly diagrammatic, of my invention.

A is a dynamo-electric machine, from which main conductors 1 2 lead, having lamps or other translating devices, $a\ a$, placed in multiple arc upon them.

3 4 is a multiple-arc circuit including the coils of the field-magnet of the machine. It also includes a resistance, B, made adjustable by means of a pivoted arm, C, also in the field-circuit, which makes contact at points $b\ b$ of the resistance. The arm C is revolved by means of a worm-wheel, D, and worm E. On the shaft of the latter are mounted two ratchet-wheels, F F′, pawls G G′ being provided, one for each ratchet-wheel. These pawls are attached respectively to armatures H H′ of electro-magnets I I′. Each of these electro-magnets I I′ is included in a division of a multiple-arc circuit, 5 6, from the main conductors 1 2, this multiple-arc circuit being divided at the point 7. The circuit 5 6 includes, also, the pivoted spring-retracted armature J of the electro-magnet K, the last being in the multiple-arc circuit 8 9 from the main line. The free end of the armature-lever J is between contact-points $c\ c'$, and also between spring-arms $d\ d$, which serve to hold it normally in a central position between the contacts; but as the armature is drawn forward by the electro-magnet K or backward by the spring $e$ it closes either the circuit 7 $c'$ 6 through the electro-magnet I′ or the circuit 7 $c$ 6 through the electro-magnet I, thus energizing one or the other of these magnets.

L represents the shaft of the engine which drives the armature of the dynamo-electric machine. A portion of such shaft is formed of two sections, $f\ g$, of metal and of insulating material, respectively. The circuit 5 6 is broken, the terminals being formed into contact-springs $h\ h$, which bear on the part $f\ g$ of the shaft, so that the circuit is alternately made and broken as the shaft revolves beneath them. By this means the magnet I or I′, whichever may be in circuit at the time, is alternately energized and demagnetized, so that its armature is caused to vibrate, and motion is communicated to the pawl and ratchet-wheel connected with such armature.

The operation of the above-described apparatus is as follows: When the number of translating devices in circuit on the main conductors 1 2 is diminished the current in the circuit 8 9 is increased, the magnet K increases in energy, and the armature J is drawn forward, closing at $c'$ the circuit 7 $c'$ 6 through the magnet I′, thus communicating a vibratory motion to the armature H′ and turning the ratchet-wheel F′ and worm-gearing E D, so as to revolve the arm C and place more of the resistance B in the field-circuit 3 4. An increase in the number of translating devices causes a reverse operation, the magnet I moving the armature H and pawl-arm G and ratchet-wheel F in the opposite direction from before, so as to throw a proper amount of resistance out of the field-circuit.

The ratchet-wheels might be connected directly with the adjusting-arm of the resistance without the interposition of the worm-gearing.

The breaking of the circuit 5 6 could be done on the armature-shaft or any other revolving portion of the generating apparatus, instead of on the engine-shaft.

I am aware that it is not original with me to regulate an electrical generator by means of an adjustable resistance in the field-circuit and an automatic mechanism for working such resistance, consisting of two electro-magnets in the divisions of a multiple-arc circuit from the main line, the circuits of such electro-magnets being controlled by an electro-magnet in a derived or multiple-arc circuit, and such electro-magnets having armature-levers working separate circuit-breakers and carrying pawls engaging with ratchet-wheels which adjust the resistance in opposite directions. I have, however, dispensed with the two magnetically-operated circuit-breakers and substituted for them a simple mechanical circuit-breaker.

What I claim is—

1. The combination of the adjustable resistance in the field-circuit of a dynamo or magneto electric machine, the pivoted arm for varying such resistance, the electro-magnets, each in a division of a multiple-arc circuit from the main line, for turning said arm in one or the other direction, means actuated by variations in the current on the main line for closing circuit to one or the other of said electro-magnets, and means actuated by any moving portion of the generating apparatus for causing successive makes and breaks of the circuit energizing said electro-magnets, substantially as set forth.

2. The combination, with the adjustable resistance in the field-circuits, of the electro-magnet in a multiple-arc circuit, two other electro-magnets the circuits of which are controlled by the first electro-magnet, the shaft of the engine or of the generator-armature formed into a circuit-breaker in the manner described, whereby the circuit to the last-mentioned electro-magnets is made and broken as the shaft revolves, a pawl-and-ratchet device operated by the armature of each of said last-mentioned electro-magnets, and an arm worked by said pawls and ratchets for adjusting the resistance, substantially as set forth.

3. The combination, with a dynamo or magneto electric machine, of an adjustable resistance for varying the strength of the field-current, an electro-magnetic escapement or escapements controlling the resistance by a step-by-step movement, and a circuit-breaker controlled by a moving part of the machinery and adapted to alternately make and break the escapement-circuit, substantially as set forth.

This specification signed and witnessed this 6th day of June, 1882.

JOHN F. OTT.

Witnesses:
WM. H. MEADOWCROFT,
H. W. SEELY.